(12) United States Patent
Mertes (10) Patent No.: US 6,470,874 B1
(45) Date of Patent: Oct. 29, 2002

(54) HIGH PRODUCTION, RIDING, CONCRETE SAW

(75) Inventor: Anthony J. Mertes, Chanhassen, MN (US)

(73) Assignee: Cimline, Inc., Minneapolis, MN (US)

( * ) Notice: Subject to any disclaimer, the term of this patent is extended or adjusted under 35 U.S.C. 154(b) by 0 days.

(21) Appl. No.: 09/487,435

(22) Filed: Jan. 19, 2000

(51) Int. Cl.$^7$ .................................................. B28D 1/02
(52) U.S. Cl. ........................................ 125/12; 451/451
(58) Field of Search ............................... 125/12, 13.01, 125/13.02, 14; 451/451, 452, 455, 340, 341, 342; 474/144; 299/39.3

(56) References Cited

U.S. PATENT DOCUMENTS

| | | |
|---|---|---|
| 2,607,432 A | 8/1952 | Lommel |
| 2,831,544 A | 4/1958 | Dunn et al. |
| 3,261,422 A | 7/1966 | Jensen |
| 3,715,002 A | 2/1973 | Halls et al. |
| 3,770,235 A | 11/1973 | Klapproth et al. |
| 4,311,204 A | 1/1982 | Shupert |
| 4,392,546 A | 7/1983 | Brown et al. |
| 4,787,678 A | 11/1988 | Holmes et al. |
| 4,848,001 A * | 7/1989 | Clark et al. ................... 30/391 |
| 4,969,624 A | 11/1990 | Ustelentsev et al. |
| 5,154,402 A | 10/1992 | Hill et al. |
| 5,161,820 A | 11/1992 | Vollmer |
| 5,350,036 A | 9/1994 | Shima |
| 5,524,721 A | 6/1996 | Yamauchi |
| 5,724,956 A * | 3/1998 | Ketterhagen ............. 125/13.01 |
| 5,857,453 A * | 1/1999 | Caven et al. ............. 125/13.01 |
| 5,876,085 A | 3/1999 | Hill |
| 5,881,990 A | 3/1999 | Kawamura |
| 6,203,112 B1 * | 3/2001 | Cook et al. ................. 299/39.3 |

* cited by examiner

Primary Examiner—Timothy V. Eley
Assistant Examiner—Dung Van Nguyen
(74) Attorney, Agent, or Firm—Alan Kamrath; Rider, Bennett, Egan & Arundel, LLP (57) ABSTRACT

A concrete saw (10) includes a cutting assembly having a high compression diesel motor (38) mounted on a carriage (40) in turn slideably mounted in a frame (22) in turn pivotally mounted to parallel rails (14) of a chassis (12) moveably supported on the concrete surface by wheels (18, 20). Concrete slurry hardened on two pairs of UHMW slides (30, 44) provided between the sliding surfaces of the carriage (40) and the frame (22) will break away and fall from the slides (30, 44) when the belt tension is adjusted. A guard (58) prevents entry of concrete slurry to the belt drive and includes a housing (66) having a U-shaped wall (68) which closely conforms to the bottom periphery of the sheave (36) of the belt drive. An operator platform including a seat (86), a footrest (88) and an armrest (90) mounted to a mount (82) is mounted by elastomer cushions (84) to a seat base (80) extending outward of the rails (14) of the chassis (12) so that the operator is located generally aligned with the saw blade (34) and is free of obstruction up to an extension (16) of the chassis (12).

20 Claims, 3 Drawing Sheets

HIGH PRODUCTION, RIDING, CONCRETE SAW

BACKGROUND

The present invention generally relates to concrete saws, specifically to high production concrete saws, and particularly to riding concrete saws.

When concrete roads are poured, they must be cut within a certain time frame. It is a known fact that concrete will begin to crack as it hardens. The objective of the saw cut is to get the concrete to crack where you want it to along control joints. When the concrete cracks, it finds the path of least resistance, which happens to be the saw cut. There are dowel bars or other expansion devices buried in the concrete. The saw cuts are perpendicular to these bars. Thus, after cracking along the saw cuts, the slab now becomes independent pads. The dowel bars allow the independent pads to expand and contract without losing alignment.

When sawing concrete, water is used as a coolant. The fine particles created by the smooth sawing (grinding) of concrete create a mixture called slurry. The slurry is very abrasive. When the water evaporates from the slurry, it once again solidifies into a hard substance.

Concrete saws historically rotate in a downward (clockwise) direction and discharge slurry rearward or in other words in an opposite direction to the forward direction of travel. For joint sawing and widening, it is desirable to discharge the slurry in a forward direction known as up-cutting or counterclockwise rotation so the joint does not fill with slurry. Slurry must be flushed out of joints before it begins to set up. The rotating forces of the up-cutting rotating blade help throw the slurry forward and out of the joint being cut. One reason it is not desirable for other applications is that slurry being discharged forward will cover the string line and the operator will have difficulty sawing straight. The primary reason for down cutting over up-cutting is the forces of the up-cutting action tend to lift the rear of the saw. This leads to poor traction and control, once again making it very difficult to saw consistently and straight.

One solution to lifting the rear of the saw by the upcutting action is adding weight. Since conventional saws are manually turned, weight and size are major factors. The riding saw concept permits a larger and heavier machine to overcome this traction problem. For this reason, an upcut saw is now productive in a riding saw.

It can be appreciated that sawing concrete involves the transfer of high torque from the power source (motor) to the saw blade. Because of the high torque requirements, belt drives are preferred for their cost and reliability over other types of drive systems such as hydraulic or gear drives. It can be appreciated that the belts transfer power through friction between the belt and the pulley, with the area of contact of the belt with the pulley being a major factor in the amount of friction and thus of power transfer. Further, the larger the pulley, the more belt wrap and contact with the pulley. However, on concrete saws, the pulley diameter is kept to a minimum so the blade diameter can also be as small as possible. As an example, if the pulley diameter is 6 inches (15 cm) and the blade is 12 inches (30 cm), the maximum cutting depth is 3 inches (12.5 cm). Since diamond blades are so expensive, controlling the pulley size is critical.

Conventional engines rotate clockwise when viewing the flywheel or output end. On conventional down-cut saws, this places the belt drive on the opposite end of the dirty sawing side of the saw. (Sawing is always done on the right side of the machine as all the controls are configured for same side sawing.) When the riding saws evolved and if conventional clockwise rotating engines are utilized, it was necessary to have the operator sit on the opposite side of the machine to place the belt drive on the opposite end of the dirty sawing side of the saw, which is unacceptable. This is so because the air intake of the engine is on that side and the contaminants would be sucked into the engine (unless an elaborate, costly air-intake systems could be designed). It is also customary to saw from the right side and operators will be uncomfortable when switching between the riding and walk-behind saws. Also, the intake side of the engine is very large in comparison to a 6 inch (15 cm) diameter output pulley. Since the operator saws via sight of the blade, the engine and the air-intake system would greatly reduce vision.

To overcome these problems in riding concrete saws, the engine was rotated 180 degrees. This places the belts on the same side as the saw blade. The belts are now exposed to all of the contaminates generated from the sawing action. Particularly, while sawing, some of the slurry gets into the belt and pulley system. The abrasive material starts grinding away at the steel grooves like a polishing compound. As the pulley grove V profile is altered, the ability of the V-belt to transfer HP is diminished (the V-belt transfers power through friction between the belt and groove).

As the belts begin to slip after exposure and wear, the natural operator reaction is to tighten the belts tighter. The current designs use a pivoting platform with an adjustment on each side. Bolts at two adjustment points on opposite sides of the plate are used to keep the two belt pulleys parallel for maximum HP transfer. As these bolts are extended, the platform rotates and the belts are tensioned. If these two adjustment points are not adjusted uniformly, which occurs often, the drive pulleys are no longer parallel. This is a big problem since the horsepower is being transferred in such a narrow space. It also creates uneven wear on the belts and pulleys.

All these factors combined forces the operator to keep over-tensioning the drive system. This eventually exceeds the overhung load capacity of the engine and causes premature engine crankshaft failure. This is a serious problem due to downtime and expense of major engine repairs.

It should be appreciated that the power source for the concrete saw must be able to operate in the dirty environment, must produce maximum power, and must be of a small size so that the saw can be compact and maneuverable. Non-liquid cooled, high torque diesel engines are a preferred form of power source, but the only such engine currently on the market has been susceptible to crankshaft failures due to excessive working loads. To overcome this problem, outboard bearings have been utilized such as suggested in U.S. Pat. No. 4,787,678. But outboard bearings make replacement of belts time consuming. Thus, it is preferred that the engine pulley be supported solely by inboard bearings as has been previously performed by the CIMLINE manually turned concrete saws.

Thus, a need continues to exist for high production concrete saws which overcome the problems and deficiencies of existing concrete saws and which provide synergistic results and advantages in the field of concrete saws.

SUMMARY

The present invention solves this need and other problems in the field of concrete saws by providing, in the preferred form, an operator platform which is elastomerically isolated from the chassis by a plurality of elastomer cushions sandwiched between a seat base and a mount. A seat, a footrest, and an armrest are each mounted to the mount, and a control joystick is mounted relative to the armrest. In the most preferred form, the operator platform and the saw blade are mounted outwardly of the rails of the chassis, with a plane defined by the saw blade extending through the operator platform.

In the preferred form where the saw blade is belt driven by a sheave located on a shaft intermediate the saw blade and the frame, a guard is provided having a housing including a U-shaped, axially extending wall closely conforming to the sheave. A seal rotatably receives the shaft and is within a radially extending panel extending across the outer edge of the U-shaped wall. A tongue extends across the inner edge of the U-shaped wall. In the most preferred form, the guard further includes a second housing having a U-shaped, axially extending wall extending around the drive pulley, with the first housing being carried by the second housing by the interconnection of the ends of the U-shaped walls.

In other preferred aspects of the present invention, the motor for the concrete saw is mounted upon a carriage which is slideably moveable in a frame. In the preferred form, slides are provided between the upper and lower surfaces and between the outer and inner surfaces of the frame and carriage, respectively, and are formed of material to which concrete slurry does not adhere effectively so that any concrete slurry which tends to harden on the slides will break away and fall from the slides.

It is thus an object of the present invention to provide a novel concrete saw.

It is further an object of the present invention to provide such a novel concrete saw of the riding type.

It is further an object of the present invention to provide such a novel concrete saw having an elastomerically isolated operator platform.

It is further an object of the present invention to provide such a novel concrete saw isolating the operator's body, feet and arm from motor vibration.

It is further an object of the present invention to provide such a novel concrete saw having an operator platform in the plane defined by the saw blade.

It is further an object of the present invention to provide such a novel concrete saw allowing the operator a relatively unobstructed straight ahead view of the sawing operation and without neck strain.

It is further an object of the present invention to provide such a novel concrete saw providing a guard preventing entry of concrete slurry in a belt drive adjacent the saw blade.

It is further an object of the present invention to provide such a novel concrete saw providing a slurry entry guard but providing ease of access for servicing.

It is further an object of the present invention to provide such a novel concrete saw providing a slurry entry guard which maximizes the effective cutting depth of the saw blade.

It is further an object of the present invention to provide such a novel concrete saw including provisions for insuring that belt drive pulleys are parallel and which are not prone to problems from hardened slurry.

It is further an object of the present invention to provide such a novel concrete saw including belt drive adjustment provisions especially useful for high compression diesel engines.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top," "bottom," "right," "left," "forward," "rear," "first," "second," "inside," "outside," "upper," "inner," "lower," "outer," "radial," "axial," and similar terms are used herein, it should be understood that these terms have reference only to the structure shown in the drawings as it would appear to a person viewing the drawings and are utilized only to facilitate describing the illustrative embodiment.

DESCRIPTION

Figure 1:
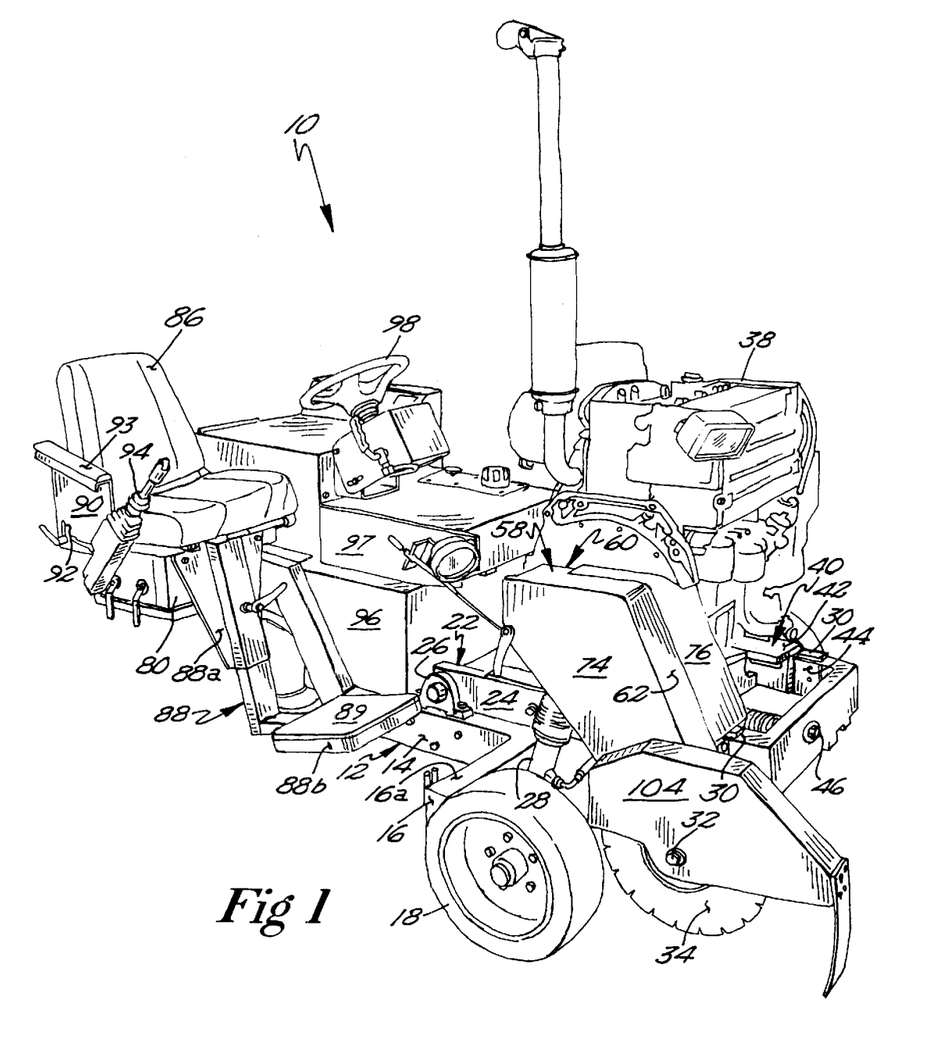
FIG. 1 shows a perspective view of a high production, riding, concrete saw according to the preferred teachings of the present invention.
Figure 2:
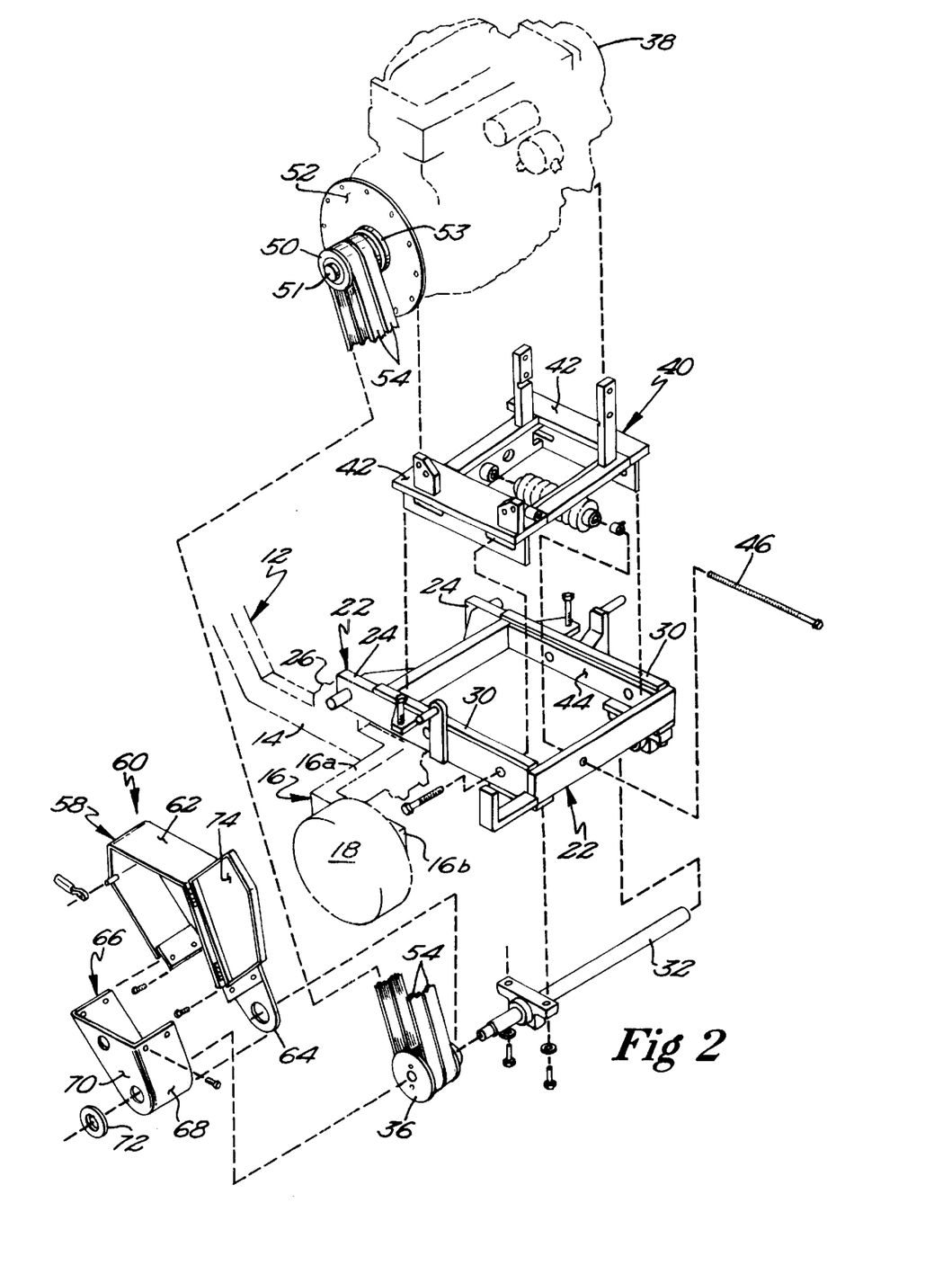
FIG. 2 shows a partial, exploded, perspective view of the high production, riding, concrete saw of FIG. 1.
Figure 3:
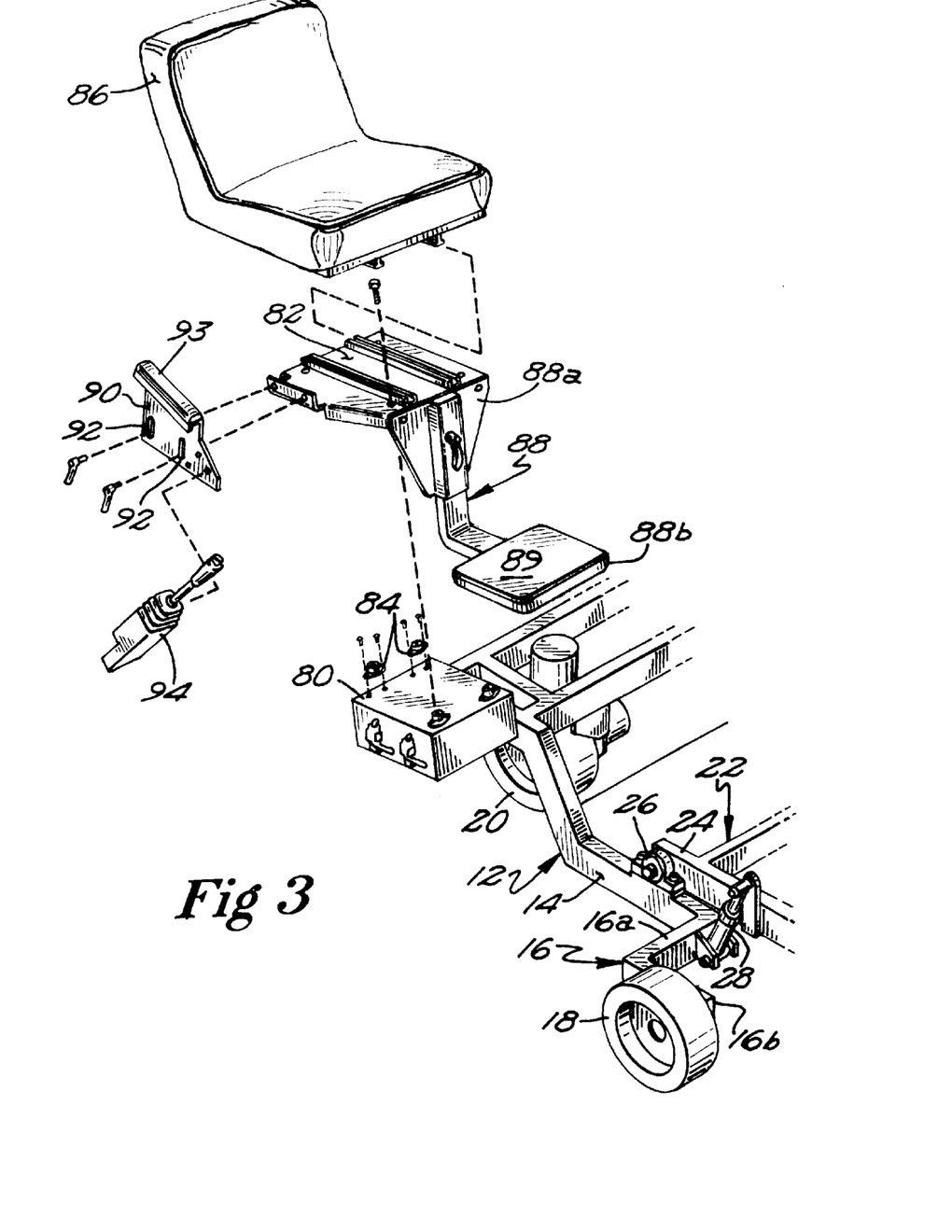
FIG. 3 shows a partial, exploded, perspective view of the high production, riding, concrete saw of FIG. 1.

A high production, riding, concrete saw according to the preferred teachings of the present invention is shown in the Figures and generally designated 10. Generally, saw 10 includes a chassis 12 which is moveable upon the concrete surface desired to be sawed. Generally, chassis 12 includes first and second parallel rails 14 having L-shaped extensions 16 extending from the front ends thereof Extensions 16 include transversely extending legs 16a extending outward from the other rail 14 and terminating in longitudinally extending legs 16b extending forward in a direction away from the back ends of rails 14. Saw 10 is moveable upon the concrete surface to be sawed by first and second, nondriven wheels 18 mounted to legs 16b and outwardly of legs 16b and rails 14. A single, steerable driven wheel 20 is suitably mounted between rails 14 adjacent the back ends thereof. In the most preferred form, wheel 20 is hydraulically driven such as by a hydraulic motor and is hydraulically steered such as by a hydraulic motor. In the most preferred form, chassis 12 is configured to position wheel 20 beneath rails 14.

Saw 10 according to the preferred teachings of the present invention further includes a cutting assembly including a pivotal frame 22 including first and second longitudinally extending sides 24. The back ends of sides 24 are suitably mounted to rails 14 such as by mounts 26 mounted to rails 24 rearwardly of extensions 16 and rotatably receiving stub shafts extending outwardly of sides 24. Suitable provisions 28 are provided to pivot frames 22 relative to chassis 12 such as hydraulic cylinders shown having a first end pivotally mounted to ears extending forwardly of legs 16a and having a second end pivotally mounted to frame 22 spaced from mounts 26. In the most preferred form, a pair of UHMW (Ultra-High Molecular Weight Polyethylene) slides 30 are mounted to the upper surfaces of sides 24. Suitable provisions such as threaded bolts are provided to adjustably limit the downward pivoting of frame 22 relative to chassis 12.

Saw 10 of the preferred form of the present invention includes a shaft 32 suitably rotatably mounted adjacent the front of frame 22 such as by bearings. A saw blade 34 is suitably mounted adjacent a free end of shaft 32 outwardly of frame 22 by any suitable means, with the saw cut plane defined by blade 34 located intermediate leg 16b of extension 16 and the first rail 14. In the most preferred form, a sheave 36 is rotatably fixed to shaft 32 intermediate saw blade 34 and frame 22, with saw blade 34 and sheave 36 located on the right side of frame 22 and rails 14 when looking in the forward movement direction. In the most preferred form, at least blade 34 but also sheave 36 are located inwardly of wheel 18 on the right side of chassis 12 and outwardly of side 24 on the right side of frame 22.

Saw 10 according to the preferred teachings of the present invention further includes a power source 38 in the preferred form of a high torque diesel engine. Suitable provisions are provided for adjustably mounting motor 38 to frame 22. Specifically in the preferred form, motor 38 is suitably mounted to a carriage 40 in the most preferred form slideably mounted to frame 22. Particularly, carriage 40 includes first and second, parallel, L-shaped carriers 42 having horizontal legs for slideable support on slides 30 of sides 24 of frame 22 and having vertical legs for slideable abutment with the inner surfaces of sides 24 of frame 22. In the most preferred form, a pair of UHMW slides 44 are suitably secured to the vertical legs of carriers 42 intermediate the vertical legs of carriers 42 and sides 24. Suitable provisions are provided for adjustably positioning carriage 40 relative to form 22. In the most preferred form where carriage 40 is slideably mounted to frame 22, an adjustment shaft 46 is rotatably mounted to frame 22 and is threaded into a threaded nut suitably secured to carriage 40. Thus, when shaft 46 is rotated such as by a suitable wrench, the threaded nut moves axially on shaft 46 in a direction parallel to slides 30 and 44 and the upper, lower, inner and outer slide surfaces of frame 22 and carriage 40 depending upon the direction of rotation of shaft 46, and as the threaded nut is fixed to carriage 40, carriage 40 slides relative to frame 22. In the most preferred form, a flexible dust boot is positioned over the threaded end of shaft 46.

Motor 38 includes a drive pulley 50, and in the most preferred form pulley 50 is cantilever supported by an inboard bearing 53 provided on motor 38 and in the preferred form is not supported by an outboard bearing such as shown in U.S. Pat. No. 4,787,678. Specifically, in the most preferred form, a stub shaft 51 is suitably secured to the rotatable output in the preferred form of the crankshaft of motor 38 mounted to frame 22. An annular bearing mounting plate 52 is secured to the body of motor 38, with shaft 51 being rotatably supported by inboard bearing 53 mounted to plate 52. Drive pulley 50 is suitably removably fixed to shaft 51 axially outward of bearing 53, with bearing 53 located between motor 38 and drive pulley 50. Thus, stub shaft 51 is free of support on the opposite side of pulley 50 than motor 38, and pulley 50 is rotatably supported in a cantilever manner by bearing 53 and in a manner to reduce overhung loads on the crankshaft of motor 38. Motor 38 further drives a hydraulic pump and a generator in the most preferred form on the opposite side of motor 38 than pulley 50. Thus, the axial spacing of pulley 50 from motor 38 and inboard bearing 53 thereof is minimized to thereby minimize the overhung load on the drive of motor 38. Suitable drive belts 54 extend between pulley 50 and sheave 36 such that motor 38 rotates shaft 32 and saw blade 34 carried thereby. It should then be appreciated that the tension of belts 54 can be adjusted by adjusting the position of carriage 40 relative to frame 22.

In the preferred form where blade 34 is located closely adjacent to drive belts 54, suitable provisions are provided to prevent slurry from contaminating the drive system. Specifically, in the most preferred form, a guard 58 is provided carried by frame 22. Particularly, guard 58 includes a first housing 60 having an inverted, generally U-shaped axially extending wall 62 positioned around drive pulley 50 and an inner, radially extending tongue 64 having an aperture through which shaft 32 intermediate sheave 36 and frame 22 extend, with first housing 60 being suitably secured to frame 22.

Guard 58 further includes a second housing 66 having a generally U-shaped axially extending wall 68 positioned around sheave 36 and an outer, radially extending panel 70 extending across the outer edge of wall 68. Panel 70 has an aperture through which shaft 32 intermediate saw blade 34 and sheave 36 extend. In the most preferred form, a UHMW seal 72 is rotatably received on shaft 32 intermediate saw blade 34 and sheave 36 and within the aperture of panel 70 to prevent slurry from entering between shaft 32 and guard 58. In the most preferred form, housing 66 is carried by frame 22 by being mounted to housing 60 such as by bolts extending between and securing together the upper, free ends of U-shaped wall 68 and the lower, free ends of U-shaped wall 62. Tongue 64 of housing 60 extends across the inner edge of wall 68. It can then be appreciated that wall 68 should conform closely to a side of a periphery and in the preferred form the bottom of sheave 36 and drive belts 54 to minimize the axial spacing from shaft 32. It should also be appreciated that sheave 36 and the lower portion of belts 54 are enclosed on three sides by wall 68, panel 70, and tongue 64.

Guard 58 further includes a pivotal door 74 pivotably mounted to housing 60, extending across and for closing the outer edge of wall 62 and for providing access to the interior of housings 60 and 66. Suitable provision such as a suitable latch can be provided to allow door 74 to be held in a closed position and pivoted to an open position when access to belts 54 and the blade drive is desired. Suitable provisions are also provided to prevent entry of slurry into guard 58 between housing 60 and motor 38. Such provisions include but are not limited to an inner, radially extending panel coextensive with tongue 64 but having an aperture formed therein for passage of drive pulley 50 and allowing movement of carriage 40 and motor 38 relative to frame 22, to exterior flexible seals 76 mounted to housing 60 and abutting with motor 38, and the like.

Saw 10 according to the preferred teachings of the present invention is of the type which carries the operator in a sitting position. Specifically, in the preferred form, chassis 12 includes a seat base 80 located outwardly of first rail 14 in a direction away from second rail 14 and on the same side of chassis 12 as saw blade 34. A seat mount 82 is mounted to seat base 80 by a multiplicity (four) of annular elastomer cushions 84 sandwiched between mount 82 of the operator platform and seat base 80, with bolts 86 extending through seat base 80, mount 82, and each elastomer cushion 84. A seat 86 including a horizontal portion for support of the buttocks and a vertical portion for support of the back of the user of any conventional design is mounted to mount 82. In the most preferred form, seat 86 includes a pressure switch which prevents providing hydraulic power to wheel 20 when weight is not present on seat 86. A foot rest 88 is also provided mounted to mount 82 and in the most preferred form includes a first sleeve portion 88a secured to mount 82 and a second, L-shaped portion 88b including a first leg telescopically slideably received in sleeve portion 88a and removably fixed or locked at one desired position of multiple positions such as by a locking pin or bolt extending through the first leg and sleeve portion 88a. Portion 88b also includes a second leg extending generally perpendicularly from the first leg and upon which the feet of the user can be placed. An armrest 90 is also mounted to mount 82 by bolts extending through vertical slots 92 to allow the height and angle of the armrest 90 to be adjusted relative to mount 82 and seat 86 according to the particular tastes of the operator. Additionally, a joy stick 94 is mounted relative to armrest 90 and positioned such that the hand of the operator can comfortably grasp and manipulate joy stick 94 when the operator's arm rests upon armrest 90. Joy stick 94 controls both the speed that wheel 20 is driven and the pivotal movement of frame 22 relative to chassis 12 in the preferred form.

Saw 10 according to the preferred teachings of the present invention further includes a fuel tank 96, a hydraulic oil tank 97, a steering assembly 98, and other compartments for containing the electrical components including but not limited to one or more batteries, and for containing other components as desired. Saw 10 according to the teachings of the present invention can further include a removable saw guide projecting from the front for following the desired saw path and the like.

A blade guard 104 can also be provided of a generally semicylindrical shape for enclosing the upper portions of blade 34 and in the most preferred form is carried by being mounted to frame 22. In the most preferred form, guard 104 is secured with quick release devices for ease of removal when servicing of blade 34 is desired.

Now that the basic construction of saw 10 according to the preferred teachings of the present invention has been explained, a mode of operation can be set forth and some of the synergistic advantages of saw 10 can be highlighted. In particular, saw 10 can be driven to the desired location where a saw cut is desired to be made. At that time and assuming motor 38 is running and rotating blade 34, the depth switch is manipulated on joy stick 94 to actuate provisions 28 to pivot frame 22 relative to chassis 12 such that saw blade 34 engages with the concrete and saws to the desired depth, with the provisions 28 typically being actuated until the stops provided on frame 22 and chassis 12 are engaged. The speed control of joy stick 94 can also be manipulated to drive wheel 20 and thereby causing forward movement of saw 10 at the desired forward speed. Steering wheel assembly 98 can also be manipulated such that the forward movement direction of saw 10 is along the desired cut line. It should be appreciated that saw 10 in the most preferred form is up-cutting so that the slurry is discharged forwardly and specifically has a reduced tendency to fill the saw cut requiring flushing. When the desired saw cut is completed, the depth switch of joy stick 94 can be manipulated to actuate provisions 28 to pivot frame 22 relative to chassis 12 such that saw blade 34 is above the concrete. At that time, saw 10 can be driven to the area of the next desired saw cut by manipulating steering assembly 98 and joy stick 94.

It should then be appreciated that saw 10 according to the preferred teachings of the present invention is advantageous in preventing the entry of slurry into the belt drive system which is located adjacent to saw blade 34 creating the slurry. In particular and as previously indicated, housing 66 (and tongue 64) including seal 72 encloses three sides of sheave 36 and the lower portion of the drive system. Similarly, housing 60, its abutment with motor 38, seal 76 and door 74 enclose three sides of pulley 50 and the upper portion of the drive system. Also, the combination of these housings 60 and 66 encloses the fourth side of the drive system such that slurry is prevented from entering in all sides of the drive system. Further, the two-part housings 60 and 66 are further advantageous in allowing wall 68 to conform closely to sheave 36 and thereby maximize the cutting depth of blade 34. In particular, the upper housing 60 can be oversized to allow movement of motor 38 and pulley 50 thereof relative to sheave 36 and frame 22 to allow belt tension adjustment whereas the lower housing 66 can be closely conformed to sheave 36 which does not require movement relative to frame 22. Further, the upper housing 60 does not require any portions to extend therethrough as does shaft 32 in the lower housing portion such that a pivotal door 74 can be provided for ease of drive inspection and access such as but not limited to belt replacement.

Diesel motors 38 are prone to vibration and provisions must be made to prevent vibration transfer. A typical method to prevent diesel engine vibration transfer is through the use of rubber isolators. Although effective in alternative drives such as hydraulic, rubber isolators are not effective in belt drives as the rubber isolators tend to compress or contort resulting in loss of parallel pulley alignment. Thus, in belt drives, which is the preferred manner of power transfer in concrete saws, the motor platform must become an integral unit with the frame 22 to eliminate vibration transfer. It should be appreciated that the entire area of the mounting of motor 38 to frame 22 is exposed to slurry, with the slurry hardening wherever it adheres. Pivoting platform adjustment provides an integral unit with frame 22 and is not prone to problems from hardened slurry. However, as set forth previously, pivoting platform adjustment is time consuming and is prone to nonuniform adjustment and the problems resulting therefrom. Sliding platform adjustment is well known to permit easy adjustment in belt drives. However, its use has been limited in concrete saws to manually turned units of a relatively small size. In particular, the power requirements of such smaller saws are less such that the motors utilized are of a smaller size than motor 38 of the present invention, and problems from hardened slurry are not as prone. However, when saws 10 having power requirements requiring diesel motors 38, with motor 38 and its attachments utilized in saw 10 of the most preferred form of the present invention weighing 820 pounds (370 kg), hardened slurry posed an insurmountable problem prior to the present invention. Saw 10 according to the preferred teachings of the present invention allows the use of a sliding platform adjustment in concrete saws 10 utilizing high torque motors 38. In particular, slurry does not adhere effectively to slides 30 and 44, and any slurry which tends to harden on slides 30 and 44 will simply break away and fall off slides 30 and 44 when carriage 40 is slid in frame 22 when shaft 46 is rotated. After adjustment is made, carriage 40 and frame 22 are sandwiched together with slides 30 and 44 acting as spacers between the inner and outer surfaces and upper and lower surfaces of frame 22 and carriage 40 such that carriage 40 and frame 22 become an integral unit and insuring parallel alignment of sheave 36 and pulley 50.

Thus, saw 10 according to the preferring teachings of the present invention permits easy adjustment of tension of drive belts 54 between sheave 36 and pulley 50 without encountering nonuniform adjustment problems encountered by pivoting platform adjustment of prior high performance concrete saws 10. It should then be appreciated that slides 30 could be carried by the lower surfaces of carriers 42 of carriage 40 and/or slides 44 could be carried by the inner surfaces of slides 24 of frame 22, if desired.

Placement of the hydraulic pump, generator and any other members requiring drive by motor 38 on the side opposite to drive pulley 50 provides many advantages in the preferred form of the present invention. Specifically, in the preferred form, when sheave 36 is adjacent to saw blade 34, such attachments are not in the line of sight of the operator to blade 34 for the creation of better operation visibility and are farther away and less prone to problems from the slurry generation. But more importantly, drive pulley 50 can be placed closer to the engine crankshaft bearings decreasing the overhung load on such bearings. The reduction in overhung loads is a major factor in the use of the inboard bearing design of saw 10 according to the teachings of the present invention. The use of inboard bearing 53 makes replacement of belts easier, but also allows synergistic cooperation with other features of saw 10 according to the preferred teachings of the present invention including but not limited to the particular configuration and arrangement of the manner that the belt drive system is enclosed.

Another problem with using a belt drive with a diesel motor 38 is the vibration created by high compression diesel motors 38 which are transmitted to frame 22 and in riding units to the operator. Prior to the present invention, the cushion provided by seat 86 was the only source of isolation of the operator, with the transmitted vibration being considered too great and controlled only to the body and not the feet or the arm of the operator in such prior saws. The manner that the operator is supported in saw 10 according to the teachings of the present invention is advantageous for several reasons. Specifically, a totally isolated operator platform is created in saw 10 according to the preferred teachings of the present invention. Particularly, the use of elastomer cushions 84 provides vibration isolation substantially greater than (the difference being in kind rather than degree) and in addition to that provided by seat 86. Additionally, as foot rest 88, armrest 90, and joy stick 94 are attached to mount 82 isolated by elastomer cushions 84 from frame 22, the operator's body as well as both the operator's feet and arm supported by armrest 90 are isolated from vibration transmitted to frame 22. Additionally, joy stick 94 is similarly rubber isolated from vibration transmitted to frame 22.

To further increase operator comfort, various adjustments are provided in saw 10 according to the teachings of the present invention. Specifically, the adjustment of portions 88a and 88b allows adjustment according to the operator's height and body type such that the operator's feet reach and are comfortably supported on portion 88b when comfortably seated in seat 86. Additionally, in the most preferred form, a vibration absorbing pad 89 is installed on portion 88b to further help increase operator comfort. Further, slots 92 allow armrest 90 to be slid up or down and to be angled slightly to the front or rear to allow the operator' arm to be supported at a comfortable angle when manipulating joy stick 94. In the most preferred form, joy stick 94 is pivoted from a neutral position to an activated position with increasing pivotable angle resulting in greater travel speed. As the joy stick 94 is biased to its neutral position in the most preferred form, the operator must maintain lever position while sawing so comfort is very important to prevent operator fatigue. In the most preferred form, armrest 90 further includes a smooth plastic slide plate 93 to allow the operator's arm to easily move or slide on armrest 90 which may be necessary many times that joy stick 94 is manipulated. In the most preferred form, seat 86 is mounted to mount 82 by slide rails arranged parallel to the direction of movement so that the operator can arrange seat 86, foot rest 88, and armrest 90 to be at a comfortable spacing from steering assembly 98. Further, the steering wheel of steering assembly 98 can be tilted in the most preferred form to the preferred operation angle of the operator.

The arrangement of the various components of saw 10 according to the teachings of the present invention results in several advantages. Specifically, the crankshaft and the weight of motor 38 is generally vertically spaced but centered on the axis of wheels 18. Additionally, due to the provisions of extensions 16, saw blade 34 can be positioned to extend behind the forward extent of chassis 12 and wheels 18 and the axis of shaft 32 and saw blade 34 is positioned just slightly forward of chassis 12 and adjacent (and preferably generally slightly behind) the forward extent of wheels 18. Thus, the major weight component is carried directly by wheels 18 such that saw 10 according to the teachings of the present invention is extremely stable and not prone to tilting about the axis of wheels 18 whatever the pivotal position of frame 22. In this regard, the weight of the liquids in fuel tanks 96 and hydraulic tank 97 as well as of the operator can readily offset the weight of saw 10 forward of the axis of wheels 18 in the most preferred form.

According to the teachings of the present invention, saw 10 is especially advantageous in allowing the operator to be in line and behind saw blade 34 for maximum visibility while minimizing obstructions and without neck strain. Specifically, seat base 80 and the operator platform mounted thereon is mounted outwardly of rails 14 of chassis 12 and on the same side of saw 10 as saw blade 34. Additionally, the provision of extensions 16 (and especially the extended length of leg 16a beyond rails on the side of chassis 12 of saw blade 34) allows the cutting assembly to be supported by chassis 12 substantially between rails 14 but sheave 36 and pulley 50 to be positioned in longitudinal alignment with rail 14 on that side of chassis 12 and with saw blade 34 and the saw cut made thereby to be located outwardly from first rail 14 in a direction away from second rail 14 such that a saw cut plane defined by saw blade 34 extends through the transverse center line of seat 86 and the operator's platform. Thus, the operator is aligned with the cut string line, saw blade 34, and the saw cut and can simply look straight ahead during normal operation, with the operator platform being free of obstruction up to extension 16.

Now that the basic teachings of the present invention have been explained, many extensions and variations will be obvious to one having ordinary skill in the art. For example, although saw 10 of the most preferred form includes the combination of several, unique features believed to obtain synergistic results, a concrete saw could be constructed according to the teachings of the present invention including such features singly or in other combinations.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Guard for a belt drive system including a frame, a rotatable output including a drive pulley and mounted to the fame, a shaft rotatably mounted to the frame and including a saw blade and a sheave located intermediate the saw blade and the frame, comprising, in combination: a first housing including a first, generally U-shaped, axially extending wall having an inner edge and an outer edge, with the first housing extending around the sheave and closely conforming to a side of a periphery of the sheave, with the first housing including an outer, radially extending panel extending across the outer edge and having an aperture through which the shaft intermediate the sheave and the saw blade extends; a seal for rotatable receipt of the shaft intermediate the sheave and the saw blade and within the aperture of the panel; a tongue extending across the inner edge and having an aperture through which the shaft on the opposite side of the sheave than the saw blade extends, with the first housing being carried by the frame; and a second housing positioned around the drive pulley and secured to the frame, with the first axially extending wall of the first housing including first and second free ends, with the first and second free ends of the first housing being mounted to the second housing with the first housing being carried by the frame through the second housing; and means for providing access to the interior of the first and second housings.

2. The guard of claim 1 wherein the second housing includes a second, generally U-shaped, axially extending wall having an inner edge, an outer edge, a first free end and a second free end, with the first free ends of the first and second housings being secured together and the second free ends of the first and second housings being secured together, with the tongue being formed with the second housing, with the access providing means comprising a pivotal door extending across the outer edge of the second, axially extending wall.

3. The guard of claim 2 further comprising, in combination: an exterior flexible seal mounted to the second housing and abutting with the output; and a blade guard enclosing portions of the saw blade and carried by the frame.

4. Concrete saw comprising, in combination: a frame including first and second sides each having an upper surface and an inner surface; a shaft rotatably mounted to the frame and for carrying a sheave and a concrete saw blade; a carriage including first and second L-shaped carriers each including a lower surface and an outer surface; a first pair of slides carried by one of the frames and the carriage and sandwiched between the upper surfaces and the lower surfaces; a second pair of slides carried by one of the frames and the carriage and sandwiched between the inner surfaces and the outer surfaces; a motor mounted to the carriage and including a drive pulley; belts extending between the drive pulley and the sheave; and means for moving the carriage relative to the frame in a direction parallel to the upper, inner, lower, and outer surfaces, with the slides being formed of material to which concrete slurry does not adhere effectively so that any concrete slurry which tends to harden on the slides will break away and fall from the slides.

5. The concrete saw of claim 4 wherein the moving means comprises, in combination: an adjustment shaft rotatable in the frame and including a threaded end; and a threaded portion carried by the carriage and receiving the threaded end of the adjustment shaft.

6. The concrete saw of claim 4 further comprising, in combination: a stub shaft including the drive pulley and rotated by the motor, with the motor including a body; a bearing mounting plate secured to the motor; and a bearing mounted to the bearing mounting plate for rotatably supporting the stub shaft, with the bearing located between the motor and the drive pulley, with the stub shaft being free of support on the opposite side of drive pulley than the motor.

7. The concrete saw of claim 6 further comprising, in combination: a hydraulic pump driven by the motor on the opposite side of the motor than the drive pulley.

8. The concrete saw of claim 7 wherein the sheave is located intermediate the saw blade and the frame; and wherein the concrete saw further comprises, in combination: a guard comprising, in combination: a first housing including a first, generally U-shaped, axially extending wall having an inner edge and an outer edge, with the first housing extending around the sheave and closely conforming to a side of a periphery of the sheave, with the first housing including an outer, radially extending panel extending across the outer edge and having an aperture through which the shaft intermediate the sheave and the saw blade extends; a seal for rotatable receipt of the shaft intermediate the sheave and the saw blade and within the aperture of the panel; and a tongue extending across the inner edge and having an aperture through which the shaft on the opposite side of the sheave than the saw blade extends, with the first housing being carried by the frame.

9. The concrete saw of claim 4 wherein the sheave is located intermediate the saw blade and the frame; and wherein the concrete saw further comprises, in combination: a guard comprising, in combination: a first housing including a first, generally U-shaped, axially extending wall having an inner edge and an outer edge, with the first housing extending around the sheave and closely conforming to a side of a periphery of the sheave, with the first housing including an outer, radially extending panel extending across the outer edge and having an aperture through which the shaft intermediate the sheave and the saw blade extends; a seal for rotatable receipt of the shaft intermediate the sheave and the saw blade and within the aperture of the panel; and a tongue extending across the inner edge and having an aperture through which the shaft on the opposite side of the sheave than the saw blade extends, with the first housing being carried by the frame.

10. Concrete saw comprising, in combination: a chassis moveable upon a concrete surface, with the chassis including first and second rails and a seat base extending outwardly from the first rail in a direction away from the second rail; a cutting assembly including a saw blade, with the cutting assembly being supported by the chassis substantially between the first and second rails but with the saw blade located outwardly from the first rail in the direction away from the second rail; and an operator platform including a mount mounted to the seat base, a seat secured to the mount, and a footrest secured to the mount, with a saw cut plane defined by the saw blade extending through the operator platform, with the footrest located intermediate the cutting assembly and the mount and outwardly from the first rail in the direction away from the second rail and being mounted to the first rail by being secured to the mount mounted to the seat base extending outwardly from the first rail.

11. The concrete saw of claim 10 wherein the chassis includes an L-shaped extension to the first rail, with the extension including a first leg extending outwardly from the first rail in a direction away from the second rail and including a second leg extending in a direction away from the operator platform, with the chassis being moveable upon the concrete surface by a wheel mounted to the second leg, with the saw cut plane located intermediate the second leg and the first rail, with the operator platform being free of obstruction up to the extension.

12. The concrete saw of claim 11 further comprising, in combination: a plurality of elastomer cushions sandwiched between the operator platform and the seat base.

13. The concrete saw of claim 12 wherein the operator platform comprises, in combination: an armrest mounted to the mount; and a joystick mounted relative to the armrest, with the joystick controlling operation of the concrete saw, with the plurality of elastomer cushions being sandwiched between the mount and the seat base.

14. The concrete saw of claim 13 wherein the footrest comprises, in combination: a first portion secured to the mount; a second portion including a foot support, with the first and second portions being slideably telescopically related; and a locking pin for removably locking the first and second portions in one of multiple positions.

15. The concrete saw of claim 14 wherein the armrest includes first and second slots; and wherein the armrest is mounted to the mount by bolts extending through the slots and the mount, with the armrest being adjustable by movement of the slots on the bolts; and wherein the armrest further includes a smooth plastic slide plate upon which the operator's arm rests.

16. Concrete saw comprising, in combination: a chassis moveable upon a concrete surface, with the chassis including first and second rails and a seat base extending outwardly from the first rail in a direction away from the second rail; a cutting assembly including a saw blade, with the cutting assembly being supported by the chassis substantially between the first and second rails but with the saw blade located outwardly from the first rail in a direction away from the second rail; and an operator platform mounted to the seat base, with a saw cut plane defined by the saw blade extending through the operator platform, wherein the cutting assembly comprises, in combination: a frame, with the frame mounted for movement relative to the chassis; a rotatable output including a drive pulley mounted to the frame, a shaft rotatably mounted to the frame and including the saw blade and a sheave located intermediate the saw blade and the frame, a first housing including a first, generally U-shaped, axially extending wall having an inner edge and an outer edge, with the first housing extending around the sheave and closely conforming to a side of a periphery of the sheave, with the first housing including an outer, radially extending panel extending across the outer edge and having an aperture through which the shaft intermediate the sheave and the saw blade extends; a seal for rotatable receipt of the shaft intermediate the sheave and the saw blade and within the aperture of the panel; and a tongue extending across the inner edge and having an aperture through which the shaft on the opposite side of the sheave than the saw blade extends, with the first housing being carried by the frame.

17. The concrete saw of claim 16 wherein the frame includes first and second sides each having an upper surface and an inner surface; wherein the cutting assembly further comprises, in combination: a carriage including first and second L-shaped carriers each including a lower surface and an outer surface; a first pair of slides carried by one of the frames and the carriage and sandwiched between the upper surfaces and the lower surfaces; a second pair of slides carried by one of the frames and the carriage and sandwiched between the inner surfaces and the outer surfaces, with the output mounted to the carriage; belts extending between the drive pulley and the sheave; and means for moving the carriage relative to the frame in a direction parallel to the upper, inner, lower, and outer surfaces, with the slides being formed of material to which concrete slurry does not adhere effectively so that any concrete slurry which tends to harden on the slides will break away and fall from the slides.

18. Concrete saw comprising, in combination: a chassis moveable upon a concrete surface, with the chassis including a seat base; a cutting assembly including a saw blade, with the cutting assembly being supported by the chassis; a plurality of elastomer cushions; a mount; a seat secured to the mount; a footrest secured to the mount; an armrest mounted to the mount; and a joystick mounted relative to the armrest, with the joystick controlling operation of the concrete saw, with the plurality of elastomer cushions being sandwiched between the mount and the seat base.

19. The concrete saw of claim 18 wherein the footrest comprises, in combination: a first portion secured to the mount; a second portion including a foot support, with the first and second portions being slideably telescopically related; and a locking pin for removably locking the first and second portions in one of multiple positions.

20. The concrete saw of claim 18 wherein the armrest includes first and second slots; and wherein the armrest is mounted to the mount by bolts extending through the slots and the mount, with the armrest being adjustable by movement of the slots on the bolts; and wherein the armrest further includes a smooth plastic slide plate upon which the operator's arm rests.

* * * * *